UNITED STATES PATENT OFFICE.

ARCHIBALD CAMPBELL PONTON, OF VIEWFIELD, PARKSTONE, COUNTY OF DORSET, ASSIGNOR TO BENJAMIN LEWIN MOSELY AND CROMPTON CHAMBERS, BOTH OF HASTINGS, ENGLAND.

ARTIFICIAL STONE.

SPECIFICATION forming part of Letters Patent No. 415,794, dated November 26, 1889.

Application filed July 14, 1888. Serial No. 279,986. (No model.)

*To all whom it may concern:*

Be it known that I, ARCHIBALD CAMPBELL PONTON, a subject of the Queen of Great Britain, residing at Viewfield, Parkstone, in the county of Dorset, England, have invented certain new and useful Improvements in the Manufacture of Artificial Stone, of which the following is a specification.

This invention relates to the manufacture of artificial stone or marble. The product is of superior character, combining great strength with durability. It can be made of a pure white or of any required color, is moldable in any form, can be produced with a fine close grain almost impermeable or with any degree of porosity, and it has acid and fire resisting qualities.

The materials employed comprise silicas, silicates, feldspars, fluor-spars, slag, glass, cryolite, burnt sand, burnt flint, and similar natural or artificially-produced substances. To these are sometimes added coarse aggregates, such as broken stone, gravel, shingle, or other suitable material. Coloring-matter that will stand kiln heat and fluxes for glazing are employed to suit special requirements. A liquid silicious cement is mixed with the materials, or any of them, to bind them together as a plastic mass, and this mass, or the cement only, is crystallized by the heat of a kiln in the tridymite form of crystallization.

For the finest-grained products any of the silicious substances named above, except the burnt sand, is reduced to an impalpable powder by any suitable means and mixed with the silicious cement into a plastic mass. For stone of a coarser quality, burnt sand or other granular or coarse aggregates in variable proportions, according to requirements, are also mixed with the above-named impalpable powder and silicious cement into a plastic mass. The proportion of the cement to the powdered, granulated, or coarse material will necessarily vary according to the relative sizes of the particles and proportions of the several classes of material to each other; but, in general, four and one-half liters of liquid cement suffices to bind together from fifty to one hundred kilograms of the powdered material or from one hundred to two hundred kilograms of the combined powder and coarse material.

The silicious cement used for binding the aforesaid particles together is composed of silicate of soda, with or without silica dissolved therein, to form a silicious hydrogel. The amount of alkali used in the silicious cement is of little importance, as the silica will be freed from its hydrous and alkaline bases when it is converted into tridymite by long-continued red or white heat. The impalpable powder or powders, with or without the coarser aggregates, are mixed with the silicious cement in any suitable mixing apparatus. It is then tamped or compressed into molds, removed therefrom, and the molded blocks are exposed in a porcelain kiln to red or white heat until the silica contained therein is converted into the tridymite state or condition of crystallization.

If the articles are too porous for a desired purpose they are immersed (either before or after firing) in a silicious bath, very free from alkalies, until saturated, then wiped, dried, and fired until crystallization has taken place. In order to produce vesicular structure by vitrification, fluoride of ammonium, or of soda, or of potash is sometimes added to the silicious cement, especially where no other fluoride is used with the powdered material; or about 5.25 grams of powdered cryolite is added to each 31.10 grams of the silicious cement. Where glazing is required, the glazes or fluxes usually employed in the ceramic art are combined with the articles in the kiln at the last firing.

The product will vary in kind according to the relative proportions of the powdered and granulated materials, or the same combined with coarse aggregates. The nature of the product is very different from stone hitherto made, inasmuch as the treatment by heat is carried further than ever before until tridymite crystallization has been effected throughout the mass, and the product is capable of withstanding fire without a permanent expansion or contraction. Furthermore, the said stone will withstand the action of such acids or agents as sulphuric acid, nitric acid, hydrochloric acid, aqua regia, and ammonia. If pure materials only are used, (which burn white in the kiln,) the product is a beautiful lustrous substance resembling the finest white marble. The grain depends upon the amount and fineness of granular material combined with the powdered material.

I claim—

The herein-described composition of matter for artificial stone, consisting of a granulated silicate, a silicious cement containing fluoride of ammonium in solution, and a suitable flux, said ingredients being mixed as described and exposed to kiln heat, substantially as and for the purpose set forth.

In testimony whereof I have signed this specification in the presence of two subscribing witnesses.

ARCHIBALD CAMPBELL PONTON.

Witnesses:
EDWARD MOSELY,
21 *Cornwallis Gardens, Hastings.*
HARRY C. LAMB,
25 *St. Andrew's Sq., Hastings.*